(12) United States Patent
Handl et al.

(10) Patent No.: US 12,326,863 B2
(45) Date of Patent: Jun. 10, 2025

(54) CONVERTING AN API INTO A GRAPH API

(71) Applicant: SAP SE, Walldorf (DE)

(72) Inventors: Ralf Handl, Heidelberg (DE); Robert Witt, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/966,096

(22) Filed: Oct. 14, 2022

(65) Prior Publication Data

US 2024/0126759 A1 Apr. 18, 2024

(51) Int. Cl.
*G06F 16/2455* (2019.01)
*G06F 16/901* (2019.01)

(52) U.S. Cl.
CPC .... *G06F 16/24553* (2019.01); *G06F 16/9024* (2019.01)

(58) Field of Classification Search
CPC .......................... G06F 16/24553; G06F 16/9024
USPC .......................................................... 707/769
See application file for complete search history.

(56) References Cited

U.S. PATENT DOCUMENTS

| | | | | |
|---|---|---|---|---|
| 7,552,450 B1 * | 6/2009 | Evans | ............... | G06F 9/44505 386/239 |
| 9,184,980 B1 * | 11/2015 | Aman | ............... | H04L 69/329 |
| 10,747,505 B1 * | 8/2020 | Lester | ............... | G06F 16/9027 |
| 2015/0112998 A1 | 4/2015 | Shankar et al. | | |
| 2019/0005163 A1 | 1/2019 | Farrell et al. | | |
| 2019/0104196 A1 * | 4/2019 | Li | ............... | G06Q 20/3823 |
| 2019/0196890 A1 | 6/2019 | Bucchi et al. | | |
| 2019/0303509 A1 | 10/2019 | Greene | | |
| 2019/0384856 A1 * | 12/2019 | Liu | ............... | G06F 40/284 |
| 2020/0396086 A1 * | 12/2020 | Biesterveld | ............... | G06F 21/64 |
| 2022/0075793 A1 * | 3/2022 | Jezewski | ............... | G06N 5/04 |
| 2024/0045742 A1 * | 2/2024 | Sagar | ............... | G06F 9/543 |

OTHER PUBLICATIONS

European Search Report dated Mar. 5, 2024 which was issued in connection with EP 23194128.7.

* cited by examiner

*Primary Examiner* — Giovanna B Colan
(74) *Attorney, Agent, or Firm* — Buckley, Maschoff & Talwalkar LLC

(57) ABSTRACT

Provided are systems and methods for transforming an operation-centric API into a graph-based API. In one example, a method may include receiving a description of an application programming interface (API), translating the description into a proxy model that comprises a list of a plurality of operations performed by the API, executing one or more heuristic programs on the proxy model to determine a plurality of entities associated with the list of operations and relationships among the plurality of entities, generating a graph API based on the plurality of entities and the relationships among the plurality of entities, wherein the graph API comprises a plurality of nodes representing the plurality of entities and edges between the plurality of nodes representing the relationships between the plurality of entities, and storing the graph API in a storage.

18 Claims, 7 Drawing Sheets

CONVERTING AN API INTO A GRAPH API

BACKGROUND

Enterprise resource planning (ERP) landscapes are continuously expanding in scale and complexity, creating growing challenges for developers of the software. Even the most experienced developers may struggle to identify and use the correct application programming interfaces (APIs), considering the diverse variety of protocols, data models, conventions, and security solutions available. Furthermore, many real-world problems span multiple lines of business (e.g., order processing, accounting, manufacturing, supply chain management, human resources, etc.) using multiple products requiring multiple APIs.

Recently, a graph-based API has been introduced as a way to abstract away the complexities and integration challenges of a traditional "operation-centric" API. For example, a graph-based API may include a connected graph with data entities serving as the nodes in the graph and edges between the nodes representing relationships among the data entities. That is, in contrast with a traditional operation-centric API, a graph-based API is an "entity-centric" API which requires different coding. However, many publicly available APIs are still available in only an operation-centric format. To transfer an operation-centric API into a graph-based API requires a developer to manually generate the coding which is a very inefficient process.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

DETAILED DESCRIPTION

Figure 1:
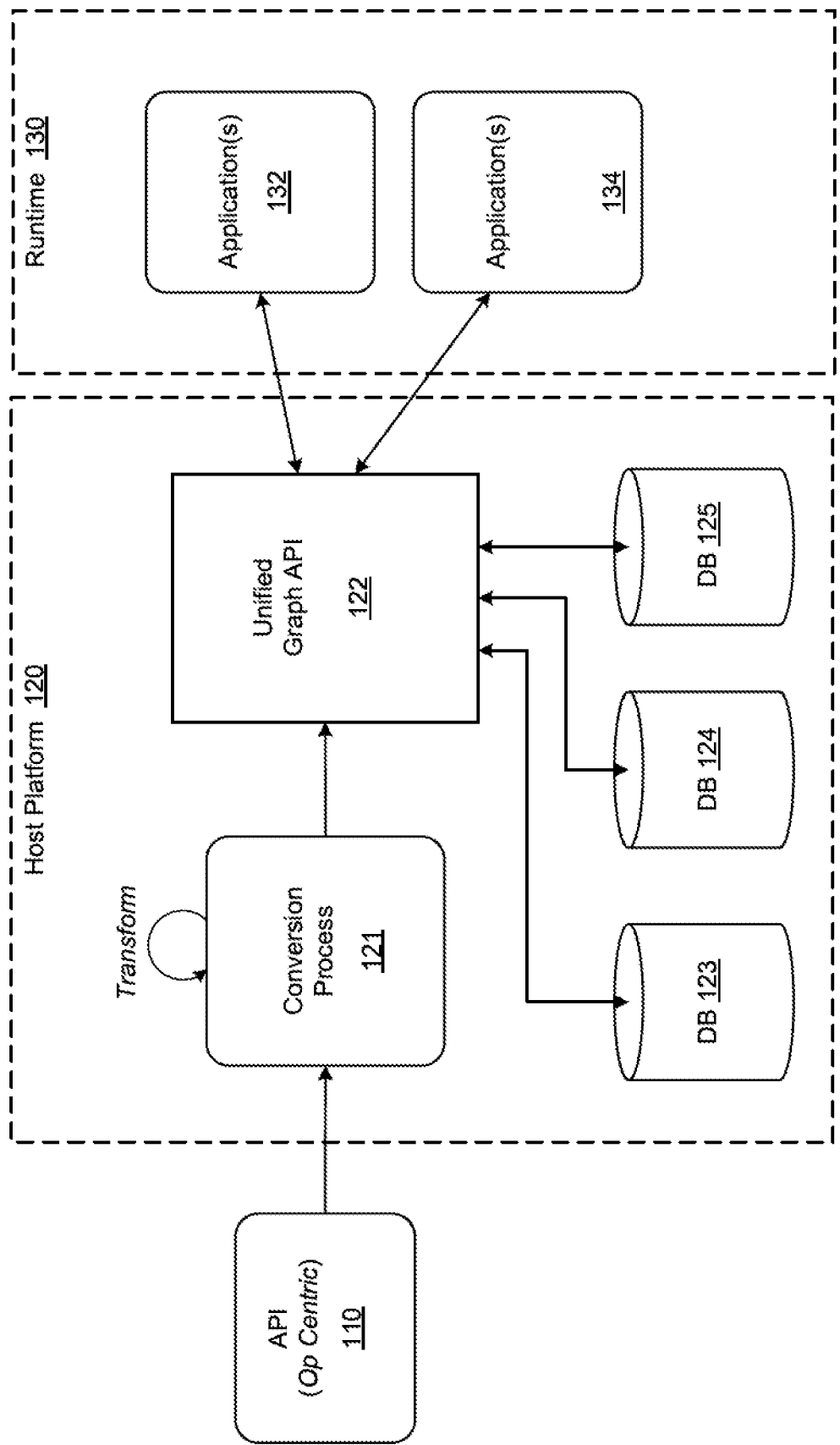
FIG. 1 is a diagram illustrating a host environment of a unified graph API in accordance with an example embodiment.

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

An enterprise resource planning (ERP) system is designed to support day-to-day business functions for an organization. For example, an ERP system may provide functionality for financial accounting, human resources, order taking, order processing, manufacturing, supply chain management, project management, customer relationship management (CRM), data services, and the like. The functionality and the data associated therewith are often spread out across multiple systems. Each system often requires its own APIs. For software that runs on top of the ERP system, the developers must include code within their software that can interact with the different APIs.

Recently, a graph-based API has been introduced to provide a layer of abstraction between different systems (such as often found in ERP systems) and the software applications that run on top. Rather than requiring a developer to interact with multiple types of APIs of different systems, a unified graph API can provide a single interface above the different systems which can be queried by applications for accessing the data and functionality of the systems. The graph API may expose a unified graph model of business objects and the relationships among them. The graph API can address the complexity and integration challenges facing developers that develop software which interacts with multiple systems by modeling the APIs via a single unified graph model that is stored in the graph API. The graph API can provide a single connected and unified view of all their business data, consolidating the data models of data sources such as a database environment, a cloud environment, and an on-premises environment, and the like, into one connected data model.

For example, an enterprise may configure the graph API to match their own landscape, which results in a connected Business Data Graph of their data. They then simply provide developers with a single secure key to the Business Data Graph, instead of exposing the complexity of data source APIs, URLs, connections, VPNs, and other separate security and trust tokens. Using standard data graph query languages, one entry point, and one ID management, developers can efficiently navigate the data through the connected graph, and no longer have to issue multiple queries to separate systems or APIs. Developers focus on the data itself, and may remain unaware of the landscape details, or where the data resides.

The graph API may be scalable and stateless middleware. For example, the graph API can abstract a landscape (underlying APIs, etc.) on behalf of a software application, accessing the public, APIs of the actual data sources under the hood. Because of the decoupling of the system landscape from software applications, enterprises can deploy graph-based applications more easily and across more landscapes, at lower cost. By using the unified graph API, applications can support a variety of landscape configurations via the unified graph API without relying on the native API calls.

Many existing APIs such as representational state transfer (REST) APIs are in a format that is referred to as "operation-centric" which is a style that is not graph-based. For example, many of the API described in the OpenAPI Specification (OAS) are in an operation-centric format. The process described herein can be used to transform API descriptions from the OAS into graph APIs. Traditionally, for these operation-centric APIs to be added or otherwise integrated into the graph API, they must be manually coded by a person such as a developer with significant experience. Furthermore, each time an API is updated the same process must be repeated. This can take several days of time resulting in significant delays and costs.

In the example embodiments, a host system can import an operation-centric application programming interface into the unified graph API. For example, the host system can import one or more APIs from the OAS into the system, transform them, and add them into the unified API graph. To do this, the system may perform a two-step process. During a first step, the system may identify various operations that are performed by the API from a file which includes the API, or a description of the API. The description may include a machine-readable file with a description of the operations, functions, methods, data, etc., which are used by the API. The operations may be clustered based on entities involved with the operations. For example, for a software application that manages a checkout process of a merchant website, a description of an API of the software application may be used to identify operations such as a put operation, a get operation, a post operation, a delete operation, and the like. The system may clean the content within the operations to prepare them for inclusion in a graph API by normalizing the content, removing unnecessary content, etc. The content may include characters such as brackets, underlining, textual terms, and the like. The content that is considered "unnecessary" may include terms, characters, and other content not related to a particular entity or operation within the API such as terms like "the", "for", "at", "to", etc. Other content that is considered unnecessary may include brackets or spaces between terms or other content. The normalization process may normalize certain terms that can have different types, cases, and abbreviations into one style.

During a second step, the operations within the API may be analyzed to identify entities that are associated with the operations. In the example of the merchant website, a first entity may be a user who is checking out on the website, a second entity may be the merchant who manages the website, a third entity may be an order that is placed by the user, and the like. Heuristic programs can be executed on the identified operations to identify entity patterns among the operations and determine the nodes that will be included in the graph API. Furthermore, the heuristic programs can identify relationships between the entities based on patterns within the underlying table data used by the entities. For example, a database or other data store may store the data used by the API in the form of tables. Keys such as primary keys and foreign keys within the tables may be used by the heuristics to identify patterns within flows of data amongst the different entities. Furthermore, a model can be built by the host system based on this analysis. The result is a graph API that can be stored and integrated into a larger unified graph API.

The host system may group operations in to clusters based on a similarity of their content such as the description of the operation or an identifier or keyword in the operation (e.g., the term "order", "sales", "pet", etc.) The host system may estimate or otherwise predict the entities and their structure from the request/response structure of the operations in each group or cluster. Also, the host system may estimate or otherwise predict relationships between the entities from patterns in their descriptions/names and the structures of their code modules which may be included in the description such as nested sub-structures of operation. Based on the entities and the determined relationships, the host system may rewrite the API as a graph API and add the graph API into a larger unified graph API.

Some of the benefits of the example embodiments is that the host system can re-model an application programming interface designed in an operation-centric style into a graph that can be integrated into a larger unified graph API. Up until now, the remodeling process has been up to the individual developers. The system described herein can significantly simplify the process for developers and can even provide a fully-automated conversion of the API into the graph API. In addition, the system can also provide the user with a user interface to fine-tune or otherwise modify any of the aspects of the graph API. The automatic transformation and import process takes only a split second. Thus, hundreds of APIs can be transformed into the unified graph API in just a few seconds.

FIG. 1 illustrates a computing environment 100 that includes a host platform 120 that manages a unified graph API 122 in accordance with an example embodiment. Referring to FIG. 1, the host platform 120 may be a cloud platform, a web server, a database, an on-premises server, a hybrid environment, and the like. In this example, the host platform 120 hosts a plurality of databases including database 123, database 124, and database 125 which may correspond to different ERP systems such as accounting, manufacturing, ordering, human resources, supply chain, and the like. Each of the databases 123, 124, and 125 may have their own APIs for accessing the data and programs therein.

In the example of FIG. 1, the unified graph API 122 may include graph-based APIs for accessing the databases 123, 124, and 125 including the programs and data that are stored therein. The graph-based APIs may comprise nodes representing entities such as the people, places, and things associated with the program and edges between the nodes which represent relationships among the entities. For example, the entities may refer to the common enterprise business objects such as customers, users, products, suppliers, sales, purchase orders, ledgers, etc. The relationships among the nodes are represented using edges that identify the data associations between the objects within the software.

In addition to the host platform 120, the computing environment 100 also includes a runtime environment 130 where live applications may run and may be interacted with via the Internet. For example, user devices (not shown) may connect to the host platform 120 via the Internet and interact with application 132 and application 134 within the runtime environment 130. In response, the applications 132 and 134 may query the host platform 120 for access to data and programs within the databases 123, 124, and 125, via the unified graph API 122. For example, the applications 132 and 134 may transmit API calls to the unified graph API 122 in response to user interaction.

According to various embodiments, the host platform 120 also hosts a conversion process 121 which can transform API programs in non-graph format into a graph API. For example, the conversion process 121 may convert an API 110 that is operation-centric (e.g., a RESTful API, etc.) into a graph API that can be integrated into the unified graph API 122. The API 110 may include functions for accessing data within the databases 123, 124, and 125. The conversion process 121 can convert the functions within the API 110 into a graph model that can be integrated into the unified graph API 122.

Figure 2A:
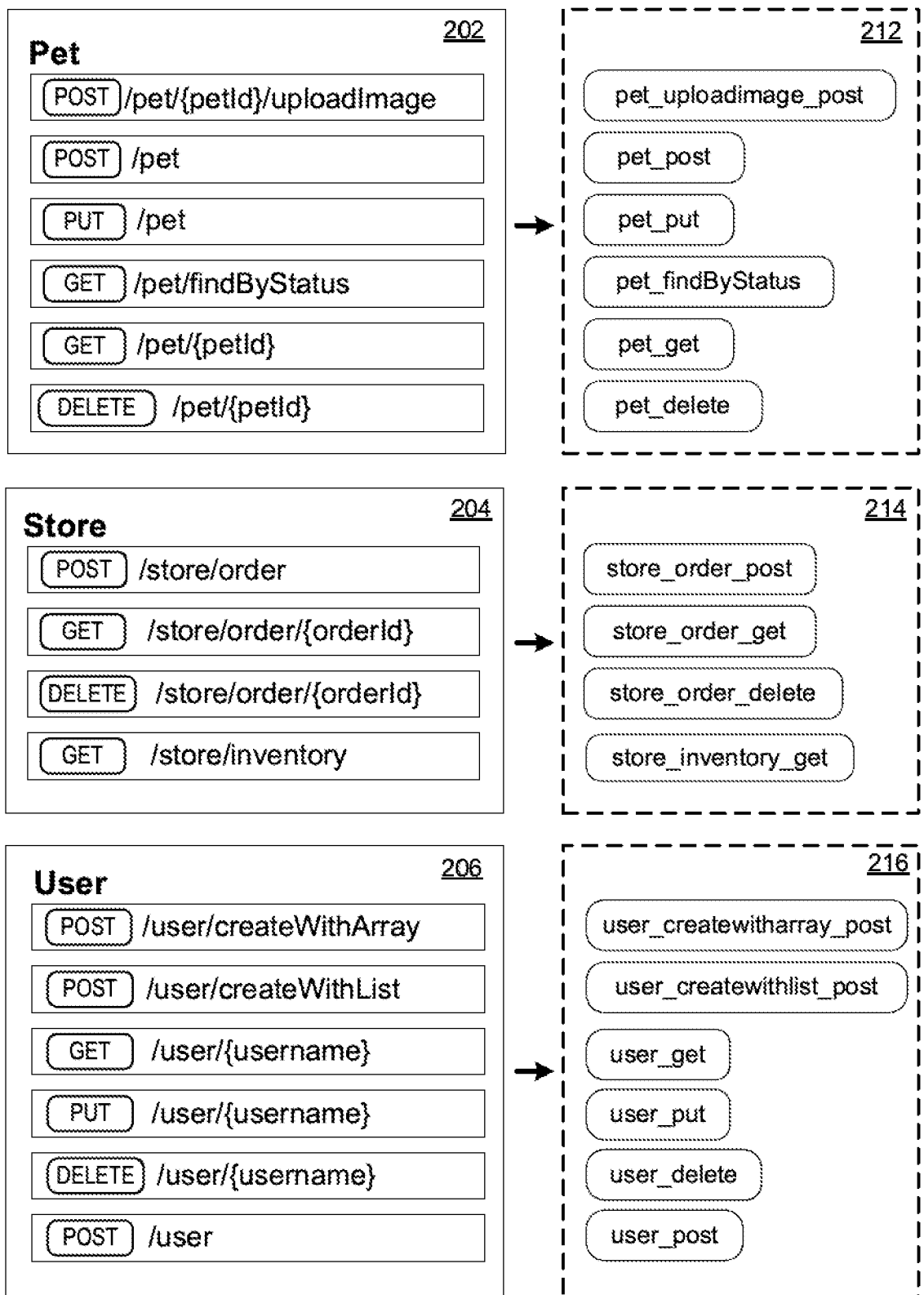
FIGS. 2A-2C are diagrams illustrating a process of converting a description of an API into a graph API in accordance with an example embodiment.
Figure 2B:
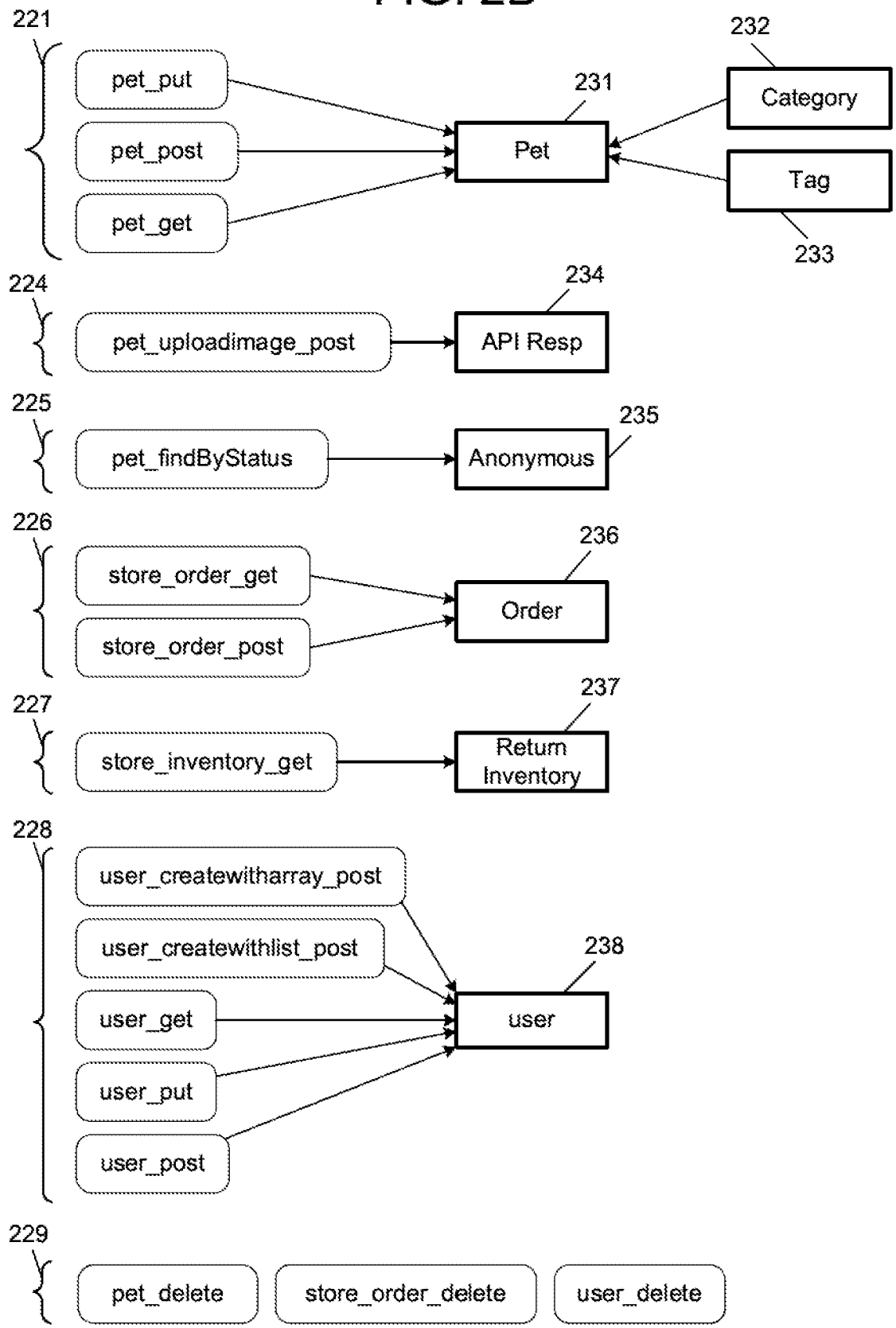
Figure 2C:
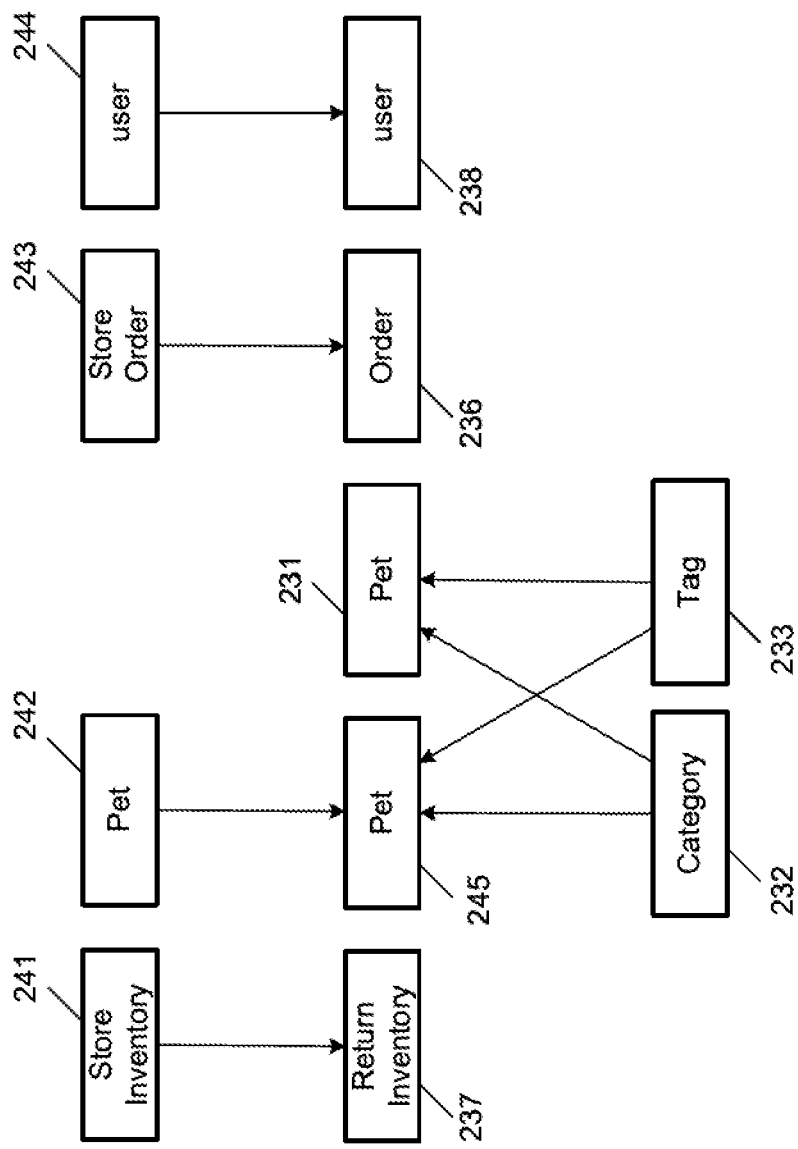

FIGS. 2A-2C illustrate a process of converting a description of an API into a graph API in accordance with an example embodiment. The process may import an API in an operation-centric format and transform the API into a graph format. Current graph-based APIs use business entities (e.g., customer, seller, order, invoice, manufacturer, shipper, etc.) as nodes in the graph. The process may be used to convert publicly available APIs in just a few seconds. The process can also be scaled to perform multiple conversions of multiple different APIs at the same time.

A traditional operation-centric API may include a description of the operations that are performed by the API. For example, the description may be stored in a separate file, such as a JavaScript Object Notation (JSON) file having a text format. The description may be machine-readable and include a list of operations, commands, instructions, or the like, which are performed by the API. In the examples herein, a two-step process can be used to transform a description of an operation-centric API into a graph API.

The two-step approach can morph an operation-centric API into a graph-based API via an automated process. In the first step, the operation-centric API description is automatically translated into a proxy model that is enriched with annotations allowing to construct requests to the remote API and interpret its responses in the terms of the proxy model. The proxy model is still operation-centric, providing a uniform basis for the second step. In the second step the proxy model is analyzed for typical entity patterns and rewritten into an entity-centric model that is then ready for API Federation.

Referring to FIG. 2A, a process 200A of the end-to-end import process is shown. The process 200A may be the first step among two steps with the second step described with respect to FIG. 2B. During the first step, a program file with a description (e.g., JSON, etc.) of an API is ingested by the host platform, and operations and entity information associated with the operations are identified. For example, a developer may upload the API or a batch of APIs to the host platform, etc. The APIs may include files with descriptions therein including source code and other descriptions of the operations performed by the respective APIs. The API description can be analyzed to identify the different operations performed by the API including get operations, put operations, post operations, delete operations, and the like. Furthermore, additional semantic content associated with the operations may be identified and used to identify entities associated with the operations and relationships among those entities.

In the example of FIG. 2A, a description 202 of the API includes a list of operations that are transformed to generate a proxy model with a transformed list of operations 212. The transformation process may include removing unnecessary terms, normalizing the terms, and the like, and using the remaining description from the list of operations 212 as part of a proxy model. In addition, a description 204 of the API may include a list of operations that are transformed to generate a list of transformed operations 214, and a description 206 of the API includes a list of operations that are transformed to generate a list of transformed operations 216. The list of transformed operations 214 and 216 are part of the proxy model. The process 200A is a fully automated "mechanical" model transformation, preserving the original operation structure, stripping away irrelevant variations in OpenAPI style, and filling in typical gaps in hand-crafted OpenAPI documents.

According to various embodiments, the proxy model generated during this step may preserve operation-centric attributes about the API including, for example, a list of actions and a list of functions, but embodiments are not limited thereto. Functions may include operations that read data from an input field and often have a nested structure. Meanwhile, actions may take a nested input and return an output with modified data. The proxy model may be stored within a file in a special text format such as in a Core Data Services Definition Language (CDL) model that remains operation-centric. CDL provides a specification that enables programmers to use data definition language to define artifacts that make up the proxy model. The CDL model is easier to process by a machine in comparison to the description 202.

In order to generate the proxy model, term names within the list of functions (names of the functions or paths of the functions) may be removed if they are not necessary to understand the function. For example, terms like "the" and "at" and other terms may be removed to get rid of any terms that are not going into the graph model. Furthermore, other terms may be normalized by modifying a spelling, changing a case (e.g., upper case to lower case, etc.), adding a number of term, etc. In FIG. 2A, the post function has a path of "/user/createWithArray" within the list of operations within the description 206 which can be normalized into user_createwitharray_post" by both removing the brackets, adding an underline between the word "user" and "create", and changing the term "WithArray" to all lower case. Other normalizations and removals are also possible.

In addition to creating the proxy model, the host platform may also "enrich" the proxy model with annotations that can be used to identify relationships among the entities and construct the graph model of the API. The annotations may be added by a developer to the description 202 that is submitted the host platform. For example, annotations may easily be identified by the predefined prefix "@". The annotations can be used to identify or otherwise reconstruct a function call within the API. The host platform can also analyze foreign keys and primary keys to identify relationships between different values within the description 202.

FIG. 2B illustrates a process 200B of identifying entity patterns and relationships among the list of operations identified during the process 200A. The process 200B may apply heuristic programs to the list of operations to identify the entities that are part of the API and to remodel the operation-centric API as a graph API which may be in an entity-centric CDL model or the like. For example, the heuristics may identify an entity which is defined by its structure, and by its key that allows identifying individual instances. Both pieces of information can be reverse-engineered from the operation-centric proxy model created in the process 200A of FIG. 2A. Business entities also can be hierarchically structured into component entities. For example, a sales order may be composed of sales order items, which themselves are composed of schedule lines. As another example, a work assignment may have job details and organizational assignments as its component parts.

During the process 200B, operations are first grouped by their URL templates, and a candidate entity name is generated from the common URL prefix. In the example of FIG. 2B, a first group of operations 221 are grouped together based on an entity (i.e., Pet) and a type of the operations. In this example, the first group of operations 221 are directed to the entity 231 (i.e., "pet") and they involve putting data, posting data, and getting data from the system. Their relationship with each other can be identified by the heuristics. Furthermore, entities 232 and 233 corresponding to Category and Tag are also identified, respectively. These entities may be recognized as component entities based on structure attribute such as nesting, a key that they have that consists of a ""parent entit"" key plus additional fields (multi-valued component), a key that they have that is identical to the parent key (e.g., single-valued component such as xxx delete, and the like).

The process may be repeated and additional groups of operations 224, 225, 226, 227, and 228 may be identified and matched to entities 234, 235, 236, 237, and 238, respectively. According to various embodiments, the matched operations may be identified based on heuristics. In this case, some operations may be identified as contributing to the graph whereas other operations 229 may not be contributing to the graph API. For example, operations such as "pet_put", "pet_post", "pet get", are identified by a data structure within the name (i.e., the term "pet"). As another example, the operation "pet delete" may be identified as contributing based on a URL template that matches the candidate operation ("pet delete") to one or more URL parameters matching the candidate entity key fields. The operations and whether they are contributing or not may be identified by the heuristics.

Then the operations 221 are checked whether they qualify as a read-by-key function, an update-by-key action, or a delete-by-key action. Read-by-key functions are the most conclusive. Their input parameters define the entity key, and their response structure defines the entity structure. Update-by-key actions are the next-most conclusive. Update-by-key actions have a request structure which is a compatible subset of the entity structure. For example, the return structure may be a subset of the entity structure, and the input parameters may be the entity keys. Delete-by-key actions are the least conclusive. Delete-by-key actions have neither a request structure nor a response structure and are identified by their URL template matching the candidate entity and their URL parameter(s) matching the candidate entity key field(s).

If one or more of the original operations have been classified as one of these "key" categories, an entity has been partially or fully identified. A complementary check may be executed by the host system to find a read-list function. The read-list function may not have path parameters and may return an array of a compatible substructure of the entity structure identified via a by-key operation. If a by-key operation is not found, and thus no candidate entity structure has been found, any array of objects may be accepted if there is one. The array of entities can be hidden within one or more wrapper objects. Accordingly, if an operation without path parameters returns an object, the object is recursively searched for a candidate for an "entity array". If an entity has been identified in this way, the remaining operations are regrouped and analyzed to find component entities using the same heuristics. The algorithm recurses until it runs out of candidate component entities. If the analysis fails, a "guess log" may be generated and an entry explaining where and why the analysis failed may be written into the guess log. If the guess log is already generated, the algorithm may add another entry to the guess log each time the analysis fails. The guesses can be used as a starting point for human experts to give hints to the guessing algorithm and rerun it again.

FIG. 2C illustrates a graph API 200C generated by transforming the operation-centric API through the process 200A and the process 200B shown in FIGS. 2A and 2B, respectively. Here, each entity 231, 232, 233, 236, 237, and 238 may be identified by the process as the nodal entities of the graph API. Furthermore, input parameters 241, 242, 243, 244, and 245 are identified as corresponding to the entities of the API. A resulting model of a graph API 200C can be stored and used for receiving and responding to future API calls. For example, the graph API 200C can be added to a larger unified graph API.

The solution automates steps that would otherwise have to be performed by human experts, thereby relieving a traditional development effort of several days per API to a few seconds. Furthermore, the automated approach can digest hundreds of APIs within seconds. The first step is fully automated and currently has a success rate of more than 95%. The second step can be fully automated but can also include a human in the loop. A human could be provided with API-specific hints, or by adding further heuristics and patterns to the algorithm. Even without hints, the process has proven a success rate of more than 40%. The transformation process described herein may be embedded into API re-modeling software providing developers with a jump-start when developing graph APIs.

Figure 3:
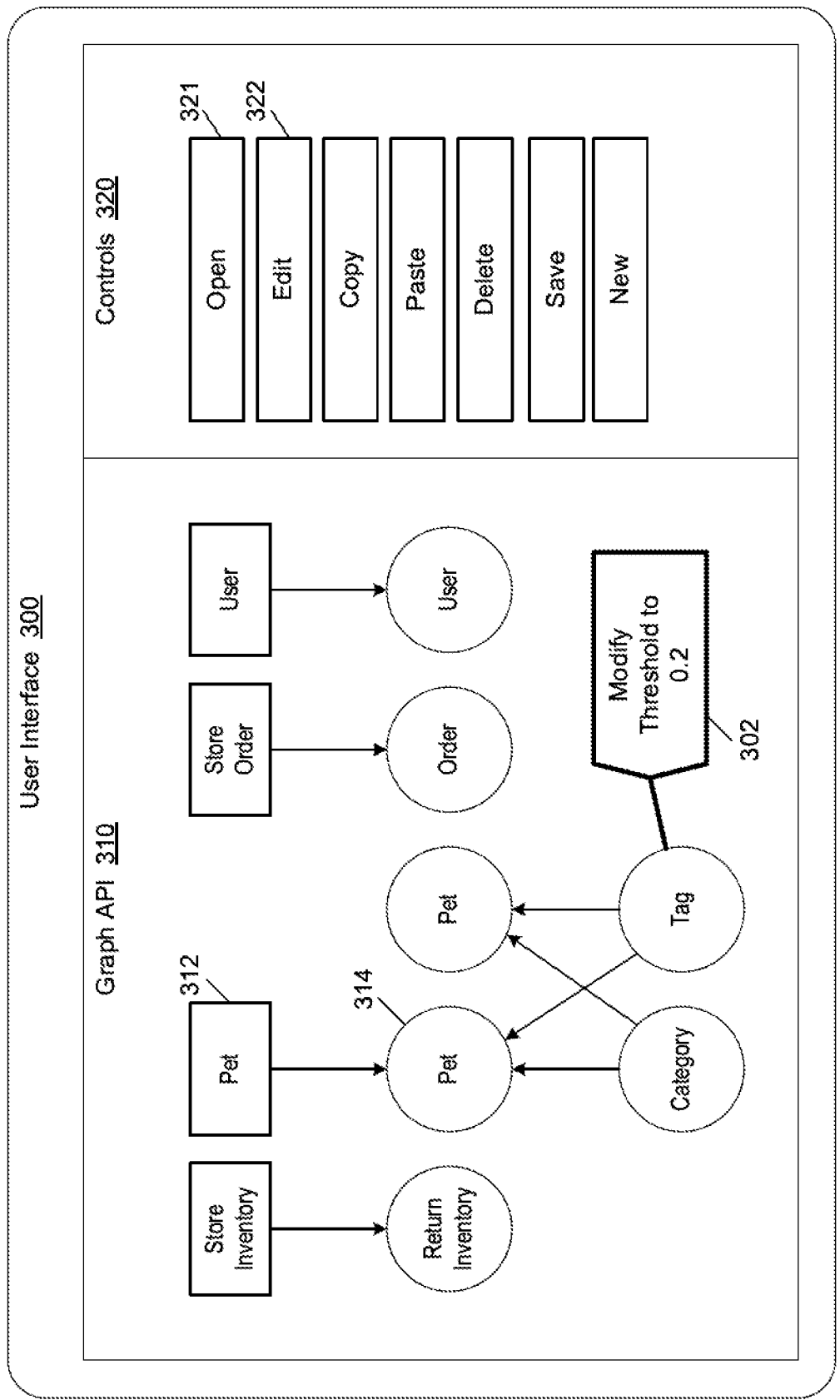
FIG. 3 is a diagram illustrating a user interface for modifying a graph API in accordance with an example embodiment.

FIG. 3 illustrates an example of a user interface 300 for modifying a graph API in accordance with an example embodiment. Referring to FIG. 3, a user can use controls 320 embedded within a control panel of the user interface 300 for opening, editing, saving, etc. a graph API generated by the example embodiments. In some cases, the graph API may be completely correct. However, in some cases, the user interface 300 may be displayed during the transformation process to allow a developer of the API to make any necessary changes. For example, the developer may click on an open button 321 and select a graph API 310. Likewise, the user may select an edit button 322 or the like to modify the graph API in some way, for example, to modify an entity name 312 and an entity structure 314. Also, "hints" can be provided by the system such as a hint 302. The hints can provide suggestions for the user and they can be based on terms and parameters identified from OpenAPI documentation, or the like.

Figure 4:
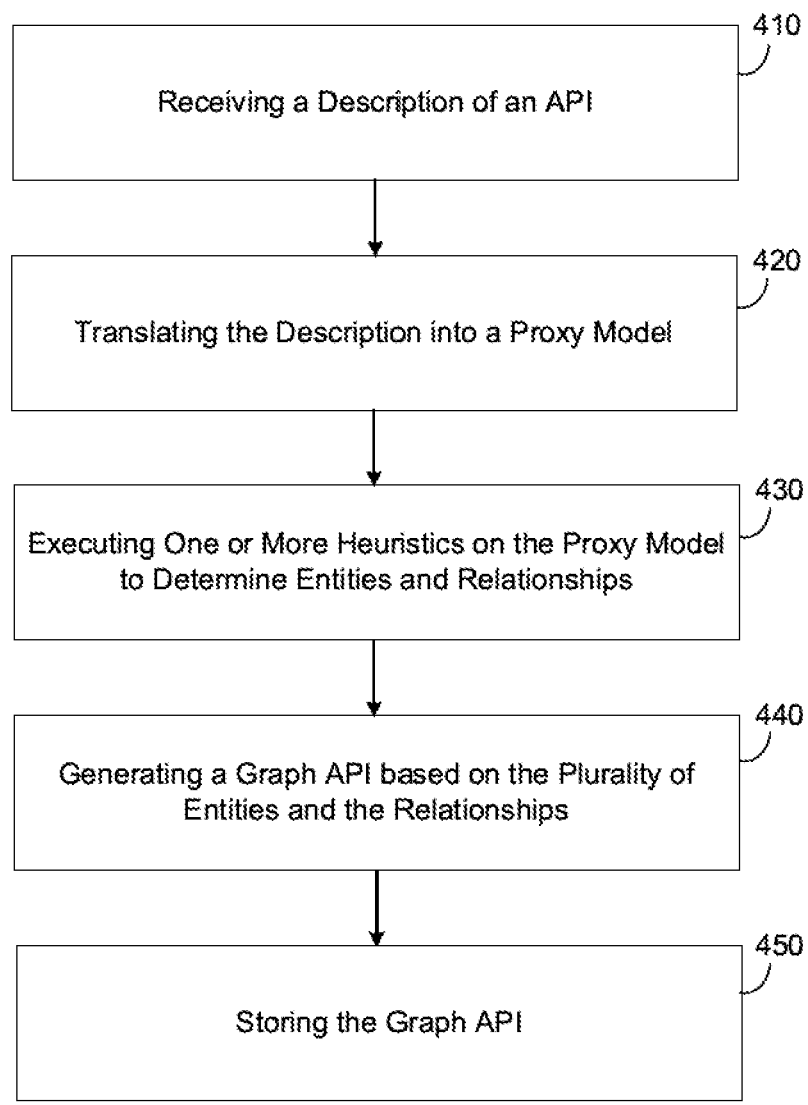
FIG. 4 is a diagram illustrating a method of converting an API into a graph API in accordance with an example embodiment.

FIG. 4 illustrates a method 400 of converting an API into a graph API in accordance with an example embodiment. As an example, the method 400 may be performed by a cloud platform, a web server, an on-premises server, a user device, a combination of devices, and the like. The method 400 may be an automated method that is performed by a software application or a suite of applications that host an enterprise resource planning (ERP) system/applications. Referring to FIG. 4, in 410, the method may include receiving a description of an application programming interface (API). The description includes a machine-readable description that includes code snippets, and the like, of the operations executed or otherwise performed by the API. In 420, the method may include translating the description into a proxy model that comprises a list of a plurality of operations performed by the API. The proxy model may be generated by removing terms and symbols from the description of the API and normalizing terms and symbols.

In 430, the method may include executing one or more heuristic programs on the proxy model to determine a plurality of entities associated with the list of operations and relationships among the plurality of entities. In 440, the method may include generating a graph API based on the plurality of entities and the relationships among the plurality of entities, wherein the graph API comprises a plurality of nodes representing the plurality of entities and edges between the plurality of nodes representing the relationships between the plurality of entities. In 450, the method may include storing the graph API in memory.

In some embodiments, the method may further include determining the plurality of entities and the relationships among the plurality of entities based on annotations within the description. In some embodiments, the receiving may include receiving a machine-readable version of the description of the API from a file and the identifying may include identifying the operations from the machine-readable version of the description of the API. In some embodiments, the operations comprise one or more of a put operation, a get operation, a post operation, and a delete operation. In some embodiments, the determining the plurality of entities may include clustering the operations into a plurality of subsets of operations based on semantic content included in the description of the API and identifying the plurality of entities from the plurality of subsets of operations, respectively.

In some embodiments, the determining may include querying a database for one or more of primary keys and foreign keys of data of the API stored in the database, and determining the relationships among the plurality of entities based on the one or more of the primary keys and the foreign keys. In some embodiments, the API may include a representational state transfer (REST) API having an operation-centric format. In some embodiments, the method may further include displaying a user interface with controls, receiving inputs for modifying the graph-based API via the controls, and modifying the graph-based API stored in the memory based on the received inputs. In some embodiments, the storing may further include integrating the graph-based API into a larger unified graph with a plurality of other graph-based APIs stored therein.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
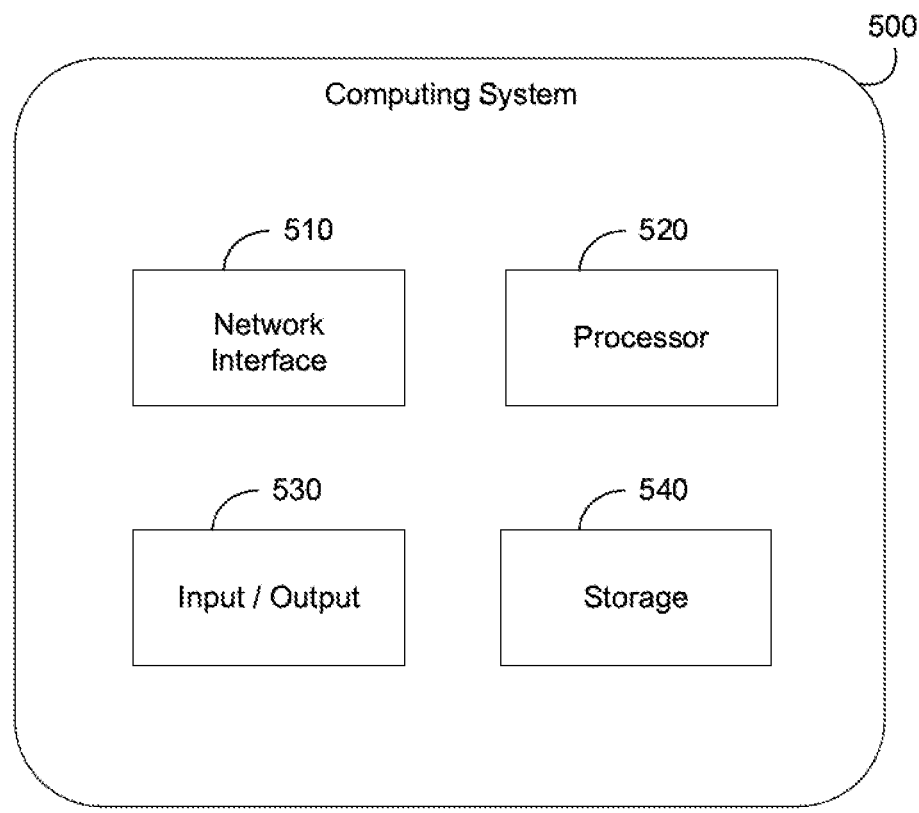
FIG. 5 is a diagram illustrating a computing system for use with any of the examples herein in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

A storage medium may be coupled to the processor such that the processor may read information from, and write information to, the storage medium. In an alternative, the storage medium may be integral to the processor. The processor and the storage medium may reside in an application-specific integrated circuit ("ASIC"). In an alternative, the processor and the storage medium may reside as discrete components. For example, FIG. 5 illustrates an example computing system 500 which may process or be integrated in any of the above-described examples, etc. As just one example, the computing system 500 may be the host platform 120 shown in FIG. 1. FIG. 5 is not intended to suggest any limitation as to the scope of use or functionality of embodiments described herein. The computing system 500 is capable of being implemented and/or performing any of the functionality set forth hereinabove.

The computing system 500 may include a computer system/server, which is operational with numerous other general purpose or special purpose computing system environments or configurations. Examples of well-known computing systems, environments, and/or configurations that may be suitable for use as computing system 500 include, but are not limited to, personal computer systems, server computer systems, thin clients, thick clients, hand-held or laptop devices, tablets, smart phones, databases, multiprocessor systems, microprocessor-based systems, set-top boxes, programmable consumer electronics, network PCs, minicomputer systems, mainframe computer systems, distributed cloud computing environments, databases, and the like, which may include any of the above systems or devices, and the like. According to various embodiments described herein, the computing system 500 may be a tokenization platform, server, CPU, or the like.

The computing system 500 may be described in the general context of computer system-executable instructions, such as program modules, being executed by a computer system. Generally, program modules may include routines, programs, objects, components, logic, data structures, and so on that perform particular tasks or implement particular abstract data types. The computing system 500 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 5, the computing system 500 is shown in the form of a general-purpose computing device. The components of computing system 500 may include, but are not limited to, a network interface 510, a processor 520 (or multiple processors/cores), an output 530 which may include a port, an interface, etc., or other hardware, for outputting a data signal to another device such as a display, a printer, etc., and a storage device 540 which may include a system memory, or the like. Although not shown, the computing system 500 may also include a system bus that couples various system components including system memory to the processor 520.

The storage device 540 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, the storage device 540 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the storage device 540 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 500 may also communicate with one or more external devices such as a keyboard, a pointing device, a display, etc.; one or more devices that enable a user to interact with computer system/server; and/or any devices (e.g., network card, modem, etc.) that enable computing system 500 to communicate with one or more other computing devices. Such communication can occur via I/O interfaces. Still yet, computing system 500 can communicate with one or more networks such as a local area network (LAN), a general wide area network (WAN), and/or a public network (e.g., the Internet) via network interface 510. As depicted, network interface 510 may also include a network adapter that communicates with the other components of computing system 500 via a bus. Although not shown, other hardware and/or software components could be used in conjunction with the computing system 500. Examples include, but are not limited to: microcode, device drivers, redundant processing units, external disk drive arrays, RAID systems, tape drives, and data archival storage systems, etc.

In the example embodiments, the storage device 540 may include a memory that is configured to store a file comprising a description of an application programming interface (API). The processor 520 may be configured to transform the description of the API (which is operation-centric) into a graph API which is entity-centric. For example, the processor 520 may identify operations performed by the API from the description of the API. The processor 520 may determine a plurality of entities associated with the actions performed by the API and relationships among the plurality of entities. The processor 520 may generate a graph model of the API which comprises a plurality of nodes representing the plurality of entities and edges between the plurality of nodes which represent the relationships between the plurality of entities. The processor 520 may store the graph model of the API in the memory of the storage device 540. Furthermore, the processor 520 may receive queries from software applications and use the transformed graph API to respond to the queries instead of the traditional operation-centric API.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described regarding specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a storage configured to store a plurality of operation-centric application programming interfaces (APIs), each of the operation-centric APIs comprising a corresponding file comprising a description of operations performed by a particular operation-centric API of the plurality of operation-centric APIs; and
   a processor configured perform an automated process to:
      for each particular operation-centric API of the plurality of operation-centric APIs, transforming the particular operation-centric API into a corresponding graph API by:
         accessing the corresponding file to obtain the description of operations performed by the particular API,
         responsive to the accessing of the corresponding file, translating the description of the operations performed by the particular API into a proxy model by removing content from the description and normalizing content within the description,
         determining a plurality of entities associated with the operations performed by the particular API and relationships among the plurality of entities via execution of heuristics on the proxy model;
         generating the corresponding graph API for the particular operation-centric API based on the plurality of entities and the relationships among the plurality of entities, where the corresponding graph API comprises a plurality of nodes representing the plurality of entities and edges between the plurality of nodes which represent the relationships between the plurality of entities; and
      combining the corresponding graph APIs generated for each of the operation-centric APIs into a unified graph API; and
      storing the unified graph API in a storage.

2. The computing system of claim 1, wherein the processor is further configured to determine the plurality of entities and the relationships among the plurality of entities based on annotations within the description.

3. The computing system of claim 1, wherein the operations comprises one or more of a put operation, a get operation, a post operation, and a delete operation.

4. The computing system of claim 1, wherein the processor is configured to cluster the operations into a plurality of subsets of operations based on semantic content included in the description of each of the operation-centric APIs and identify the plurality of entities from the plurality of subsets of operations, respectively.

5. The computing system of claim 1, wherein the processor is further configured to query an external database for one or more of primary keys and foreign keys of data of each of the operation-centric APIs stored in the database, and determine the relationships among the plurality of entities based on the one or more of the primary keys and the foreign keys.

6. The computing system of claim 1, wherein the each of the operation-centric APIs comprise a representational state transfer (REST) API having an operation-centric format.

7. The computing system of claim 1, wherein the processor is further configured to display a user interface with controls, receive inputs for modifying the unified graph API via the controls, and modify the unified graph API stored in the storage based on the received inputs.

8. An automated method comprising:
receiving multiple files, each file of the multiple files comprising a corresponding operation-centric application programming interface (API), and each file including a description of operations performed by the corresponding operation-centric API;
translating the description for each file into a proxy model that comprises a list of a plurality of the operations performed by the corresponding operation-centric API;
executing one or more heuristic programs on the proxy model to determine a plurality of entities associated with the list of operations and relationships among the plurality of entities;
transforming the corresponding operation-centric API into a corresponding graph API, the transforming comprising generating the corresponding graph API based on the plurality of entities and the relationships among the plurality of entities, wherein the corresponding graph API comprises a plurality of nodes representing the plurality of entities and edges between the plurality of nodes representing the relationships between the plurality of entities;
combining the corresponding graph API with other graph APIs generated from descriptions for other files of the multiple files into a unified graph API; and
storing the unified graph API in a storage.

9. The method of claim 8, wherein the method further comprises determining the plurality of entities and the relationships among the plurality of entities based on annotations within the description.

10. The method of claim 8, wherein the operations comprises one or more of a put operation, a get operation, a post operation, and a delete operation.

11. The method of claim 8, wherein the determining the plurality of entities comprises clustering the operations into a plurality of subsets of operations based on semantic content included in the description of the corresponding operation-centric API and identifying the plurality of entities from the plurality of subsets of operations, respectively.

12. The method of claim 8, wherein the determining comprises querying an external database for one or more of primary keys and foreign keys of data of the corresponding operation-centric API stored in the database, and determining the relationships among the plurality of entities based on the one or more of the primary keys and the foreign keys.

13. The method of claim 8, wherein the corresponding operation-centric API comprises a representational state transfer (REST) API having an operation-centric format.

14. The method of claim 8, wherein the method further comprises displaying a user interface with controls, receiving inputs for modifying the unified graph API via the controls, and modifying the unified graph API stored in the storage based on the received inputs.

15. A non-transitory computer-readable storage medium comprising instructions which when executed by a processor cause a computer to perform an automated method comprising:
receiving multiple files, each file of the multiple files comprising a corresponding operation-centric application programming interface (API), and each file including a description of operations performed by the corresponding operation-centric API;
translating each file into a proxy model that comprises a list of the operations performed by the corresponding operation-centric API, the list of the operations being determined from the description of the operations;
determining a plurality of entities associated with the list of operations performed by the corresponding operation-centric API and relationships among the plurality of entities via execution of one or more heuristics on the proxy model;
transforming the corresponding operation-centric API into a corresponding graph API, the transforming comprising generating the corresponding graph API based on the plurality of entities and the relationships among the plurality of entities, wherein the corresponding graph API comprises a plurality of nodes representing the plurality of entities and edges between the plurality of nodes representing the relationships between the plurality of entities; and
integrating the corresponding graph API with other graph APIs generated from other files of the multiple files into a unified graph API within storage.

16. The non-transitory computer-readable storage medium of claim 15, wherein the receiving comprises receiving a machine-readable file that comprises a machine-readable description of the corresponding operation-centric API and the translating comprises identifying the list of operations from the machine-readable description of the corresponding operation-centric API.

17. The non-transitory computer-readable storage medium of claim 15, wherein the determining the plurality of entities comprises clustering the operations into a plurality of subsets of operations based on semantic content included in the list of operations and identifying the plurality of entities from the plurality of subsets of operations, respectively.

18. The non-transitory computer-readable storage medium of claim 15, wherein the method further comprises receiving an API call from a software application and in response, executing the API call on the unified graph API.

* * * * *